United States Patent
Cruise et al.

(10) Patent No.: US 8,154,248 B2
(45) Date of Patent: Apr. 10, 2012

(54) SIGNAL FOR PRE-CHARGE SELECTION IN LITHIUM CHARGING AND DISCHARGE CONTROL/PRE-CHARGE FUNCTION

(75) Inventors: Nathan Cruise, Phoenix, MD (US); Tarek Aydin, Edgewood, MD (US); Keith D. Flaharty, Wrightsville, PA (US); Fugen Qin, Baltimore, MD (US); Steven J. Phillips, Ellicott City, MD (US)

(73) Assignee: Black & Decker Inc., Newark, DE (US)

( * ) Notice: Subject to any disclaimer, the term of this patent is extended or adjusted under 35 U.S.C. 154(b) by 564 days.

(21) Appl. No.: 12/247,086

(22) Filed: Oct. 7, 2008

(65) Prior Publication Data

US 2010/0085012 A1    Apr. 8, 2010

(51) Int. Cl.
  *H02J 7/00*  (2006.01)
  *H02J 7/04*  (2006.01)
  *H02J 7/16*  (2006.01)

(52) U.S. Cl. ........ 320/112; 320/134; 320/149; 320/155; 320/160; 320/162; 320/113; 320/114; 320/115; 324/426; 340/636.1; 340/636.21; 200/43.17

(58) Field of Classification Search .................. 320/134, 320/112, 113, 114, 115, 149, 155, 160, 162; 324/426; 340/636.1, 636.21; 200/43.17
See application file for complete search history.

(56) References Cited

U.S. PATENT DOCUMENTS

| | | | |
|---|---|---|---|
| 5,371,453 A | 12/1994 | Fernandez | |
| 5,576,612 A | 11/1996 | Garrett et al. | |
| 5,582,928 A | 12/1996 | Farley | |
| 5,608,304 A | 3/1997 | Okumura | |
| 5,617,010 A | 4/1997 | Higashijima et al. | |
| 5,633,573 A * | 5/1997 | van Phuoc et al. | 320/128 |
| 5,652,501 A | 7/1997 | McClure et al. | |
| 5,796,238 A | 8/1998 | Hiratsuka et al. | |
| 5,818,201 A * | 10/1998 | Stockstad et al. | 320/119 |
| 5,909,101 A | 6/1999 | Matsumoto et al. | |
| 5,963,019 A | 10/1999 | Cheon | |
| 5,998,972 A | 12/1999 | Gong | |
| 6,054,843 A | 4/2000 | Oglesbee et al. | |
| 6,075,343 A | 6/2000 | Hsu | |
| 6,137,265 A * | 10/2000 | Cummings et al. | 320/133 |
| 6,172,487 B1 | 1/2001 | Brotto | |

(Continued)

FOREIGN PATENT DOCUMENTS

EP            0 448 767 B1    10/1991

(Continued)

*Primary Examiner* — Patrick Assouad
*Assistant Examiner* — Steve T Chung
(74) *Attorney, Agent, or Firm* — Harness, Dickey & Pierce, P.L.C.

(57) ABSTRACT

A rechargeable battery pack for a power tool can have a data terminal that provides a signal that is indicative of whether the voltage is below a threshold and can serve as both a pre-charge signal for a charger and as a stop-discharge signal for a power tool. A charger can include a power supply circuit and a voltage detection circuit. A charger control module can receive a signal indicative of the voltage of the battery pack and determine a pre-charge time based on the voltage and can monitor a change in the voltage of the battery pack during the pre-charge operation and stop the pre-charge operation based on the change in voltage and the time period.

30 Claims, 5 Drawing Sheets

U.S. PATENT DOCUMENTS

| | | |
|---|---|---|
| 6,346,795 B2 | 2/2002 | Haraguchi et al. |
| 6,369,576 B1 * | 4/2002 | Matthews et al. ............. 324/426 |
| 6,664,000 B1 | 12/2003 | Sonobe |
| 6,744,234 B2 | 6/2004 | Odaohhara et al. |
| 6,819,083 B1 | 11/2004 | Patino et al. |
| 6,914,415 B2 | 7/2005 | Bohne et al. |
| 7,068,013 B2 | 6/2006 | Patino et al. |
| 7,183,748 B1 * | 2/2007 | Unno et al. .................... 320/136 |
| 7,205,748 B2 | 4/2007 | Nishida et al. |
| 7,274,171 B2 | 9/2007 | Nishida et al. |
| 7,378,819 B2 | 5/2008 | Wang et al. |
| 7,436,149 B2 * | 10/2008 | Luo et al. ....................... 320/115 |
| 2001/0017534 A1 | 8/2001 | Haraguchi et al. |
| 2002/0195996 A1 | 12/2002 | Nakatsuji |
| 2005/0052159 A1 | 3/2005 | Moore et al. |
| 2005/0073282 A1 | 4/2005 | Carrier et al. |
| 2005/0212484 A1 | 9/2005 | Denning et al. |
| 2006/0043932 A1 | 3/2006 | Nishida et al. |
| 2006/0113962 A1 | 6/2006 | Spiridon |
| 2006/0152194 A1 * | 7/2006 | Wang et al. ................... 320/121 |
| 2006/0192531 A1 | 8/2006 | Nishida |
| 2006/0197499 A1 | 9/2006 | Bucur et al. |
| 2006/0284598 A1 | 12/2006 | Xiong |
| 2007/0013341 A1 | 1/2007 | Hitomi et al. |
| 2007/0075682 A1 | 4/2007 | Guang et al. |
| 2007/0103113 A1 * | 5/2007 | Embrey et al. ................ 320/112 |
| 2007/0132427 A1 | 6/2007 | Veselic |
| 2007/0159135 A1 | 7/2007 | Teraoka |
| 2007/0164709 A1 | 7/2007 | Tsubaki et al. |
| 2007/0210751 A1 | 9/2007 | Wang et al. |
| 2007/0222420 A1 | 9/2007 | Nishida et al. |
| 2007/0247107 A1 | 10/2007 | Wang et al. |
| 2007/0273328 A1 | 11/2007 | Nam et al. |
| 2008/0018304 A1 | 1/2008 | Litingtun et al. |
| 2008/0048620 A1 | 2/2008 | Zhang |
| 2008/0180059 A1 * | 7/2008 | Carrier et al. ................. 320/112 |

FOREIGN PATENT DOCUMENTS

| | | |
|---|---|---|
| EP | 0 574 753 B1 | 12/1993 |
| EP | 0 846 362 B1 | 6/1998 |
| EP | 0661769 B1 | 9/1998 |
| EP | 0750385 B1 | 10/2001 |
| EP | 0846362 B1 | 9/2003 |
| EP | 1 796 243 A2 | 6/2007 |
| EP | 1821384 | 8/2007 |
| EP | 1892791 A1 | 2/2008 |

* cited by examiner

SIGNAL FOR PRE-CHARGE SELECTION IN LITHIUM CHARGING AND DISCHARGE CONTROL/PRE-CHARGE FUNCTION

FIELD

The present disclosure relates to rechargeable battery packs for power tools, and more specifically to signals for pre-charge selection and discharge control/pre-charge functioning.

BACKGROUND

Rechargeable battery packs may provide a power source for cordless power tools. The battery pack may have a battery with a design voltage and may provide power to operate a power tool. The battery itself may consist of a number of individual battery cells that may be combined within the battery pack to provide a desired voltage. A lithium-ion battery may have a design voltage such as 18, 15, 12, or 9 volts, by way of non-limiting example. It may be desired to prevent overcharging of any battery cell within a lithium-ion battery, such as by disabling charging of the battery cells.

The batteries may include an internal discharge switch, such as an FET, that the battery uses to disable/enable use (discharge) of the battery. The inclusion of this discharge switch in the battery is an additional expense and takes up space within the battery pack. It may be desired to remove the discharge switch from the battery pack.

Lithium-ion batteries may be subject to a soft short circuit if the voltage of the battery pack is held at a low value. A soft short circuit may develop into a hard short circuit which may ruin the battery pack. It may be desired to prevent operation of the battery pack at a low voltage and to prevent or minimize the possibility for creating soft short circuits. Further, it may be desired to monitor the charging of the battery and conduct a pre-charge operation to ascertain the condition of the battery pack prior to implementing a fast or rapid charge operation.

The statements in this section merely provide background information related to the present disclosure and may not constitute prior art.

SUMMARY

This section provides a general summary of the disclosure, and is not a comprehensive disclosure of its full scope or all of its features.

A battery charger according to the present disclosure is operable to charge a battery pack having a plurality of battery cells and at least one data terminal providing an under-voltage signal indicative of a voltage of the battery cells relative to a low-voltage threshold. The charger can include a power supply circuit operable to supply a first charge current of a first value and a second charge current of a second value substantially less than the first value. A charger control module can be adapted to receive the under-voltage signal from the data terminal of the battery pack and can be operable to direct the power supply circuit to supply the first and second charge currents based on the under-voltage signal. The power supply circuit supplies the first charge current when the under-voltage signal is indicative of every one of the battery cells being at or above the low-voltage threshold. The power supply circuit supplies the second charge current when the under-voltage signal is indicative of any one of the battery cells being below the low-voltage threshold. The charger according to the present disclosure can thereby utilize an under-voltage signal that is provided by the battery pack to determine whether to implement a charging current of the first or second value. The under-voltage signal can have first and second states and can be free of any information associated with any specific one of the battery cells.

A power tool battery pack charger according to the present disclosure can include a power supply circuit operable to supply a charge current to a battery pack. A voltage detection circuit can be operable to detect a voltage of the battery pack. A charger control module can be adapted to receive a signal from the voltage-detection circuit that is indicative of the voltage of the battery pack. The charger control module can be operable to control supplying of the charge current from the power supply circuit to the battery pack. The charger control module can be adapted to determine a time period for a pre-charge operation based on the voltage of the battery pack. The charger control module can also be adapted to monitor a change in the voltage of the battery pack during the pre-charge operation. The charger control module can be operable to stop the pre-charge operation as a function of the change in voltage and the time period. Thus, the charger can advantageously determine an appropriate time period for a pre-charge operation. The appropriate time period is not a one-size-fits-all time period and, rather, can be based on the voltage of the battery pack. Additionally, the charger can monitor a change in the voltage of the battery pack during the pre-charge operation and terminate the pre-charge operation based on the change in voltage. This capability enables the charger to advantageously attempt to charge batteries that may be initially in a severely discharged state but yet may still contain healthy cells. Additionally, the charger can detect when the cells are not healthy and terminate the pre-charge operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Corresponding reference numerals indicate corresponding parts throughout the several views of the drawings.

Figure 1:
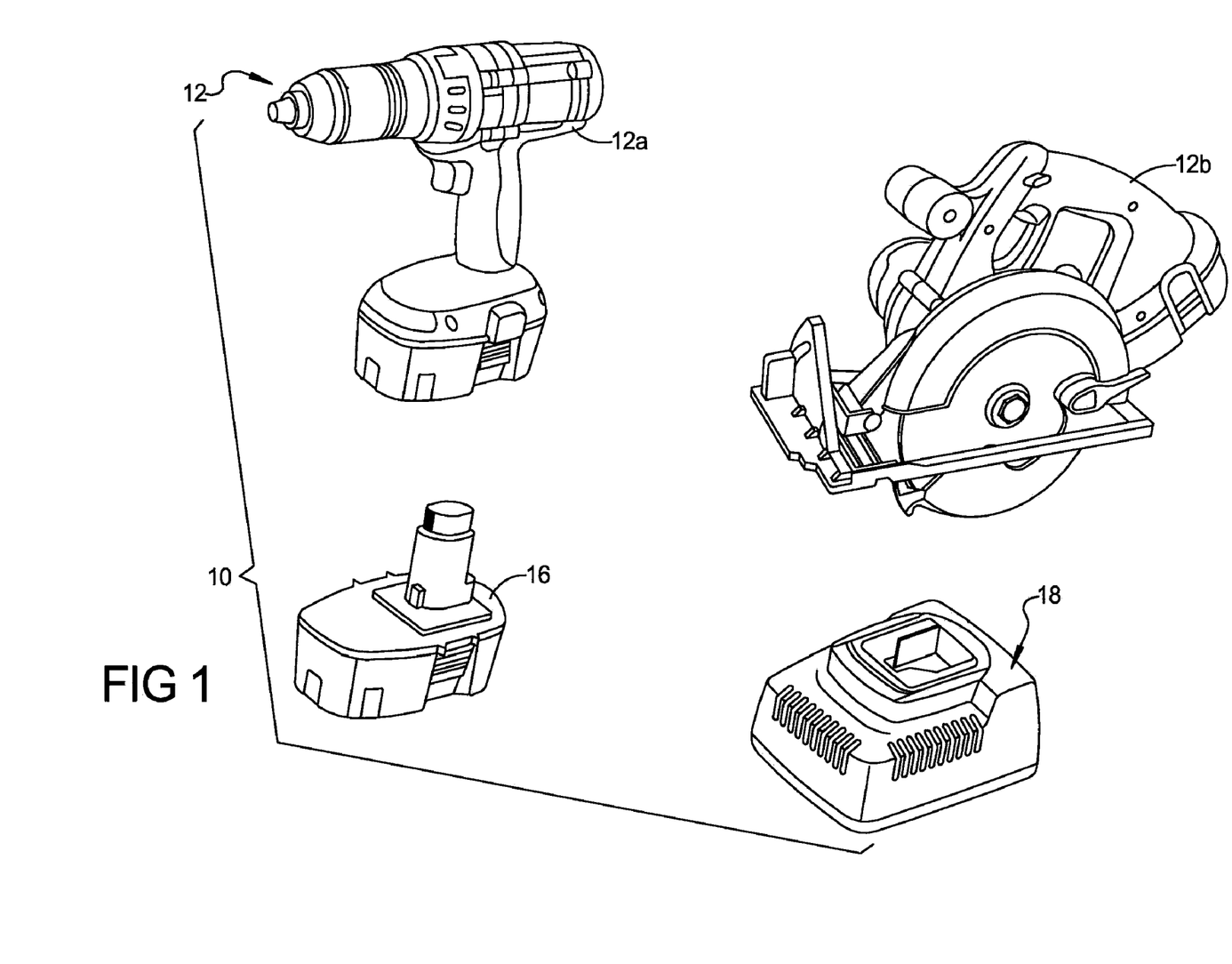
FIG. 1 is a drawing depicting a system of power tools, including a battery pack, power tools, and a charger.

The present disclosure can relate to a system of power tools of the type that is generally indicated by reference numeral 10 in FIG. 1. The system of power tools 10 can include, for example, one or more power tools 12, a battery pack 16, and a battery pack charger 18. Each of the power tools 12 can be any type of power tool, including without limitation drills, drill/drivers, hammer drill/drivers, rotary hammers, screwdrivers, impact drivers, circular saws, jigsaws, reciprocating saws, band saws, cutoff tools, cutout tools, shears, sanders, vacuums, lights, routers, adhesive dispensers, concrete vibrators, lasers, staplers, and nailers. In the particular example provided, system of power tools 10 includes a first power tool 12a and a second power tool 12b. For example, first power tool 12a can be a drill/driver similar to that which is described in U.S. Pat. No. 6,431,389, while second power tool 12b can be a circular saw similar to that which is described in U.S. Pat. No. 6,996,909. Battery pack 16 can be selectively removably coupled to first and second power tools 12a and 12b to provide electrical power thereto. Battery pack 16 can also be selectively electrically coupled to charger 18 to charge battery pack 16. It is noteworthy that the broader aspects of this disclosure are applicable to other types of battery-powered devices.

Figure 2:
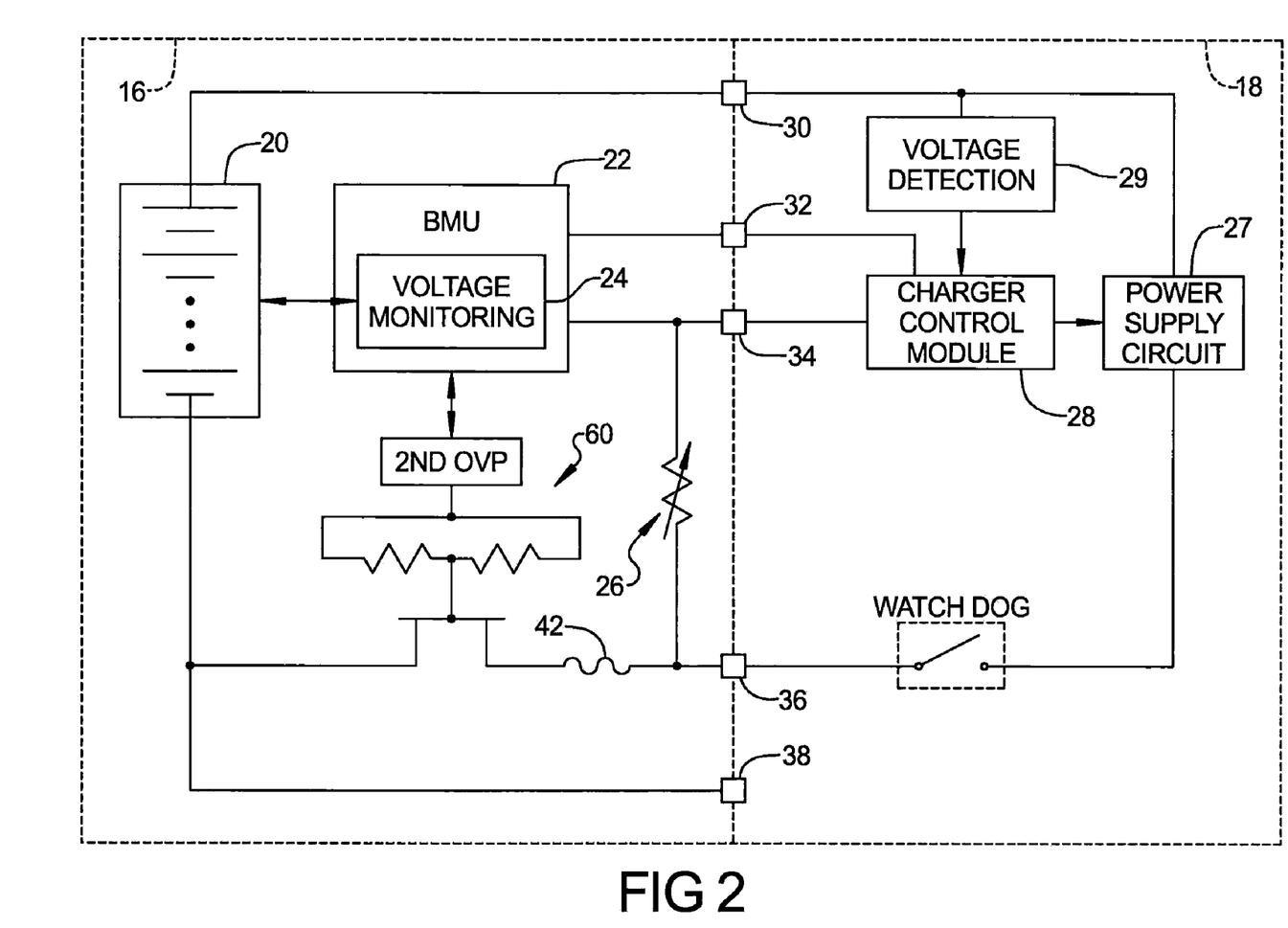
FIG. 2 is a block diagram of an exemplary configuration for a battery pack operably coupled to a battery charger.

FIG. 2 illustrates an exemplary configuration of a battery pack 16 operably coupled to charger 18. Battery pack 16 is generally comprised of a plurality of battery cells 20, a battery management unit (BMU) (also known as a battery control unit) 22, and various battery control circuits. However, the exemplary configuration is merely provided as a context for describing the various methods and circuits disclosed herein.

Battery pack 16 may include a plurality of battery cells 20 connected in series, and/or a plurality of serially connected strings of cells, in which the strings are in parallel with one another. For purposes of describing the exemplary embodiments, battery pack 16 may be composed of cells 20 having lithium-ion cell chemistry. In the context of cordless power tools, the nominal voltage rating of battery pack 16 is typically at least 18 volts. However, other voltage ratings are contemplated for different applications. In addition, battery pack 16 may be composed of cells of another lithium-based chemistry, such as lithium metal or lithium polymer, or other chemistry. Furthermore, battery packs 16 having cells that need temperature based control and/or over/under voltage control can also be used and may benefit from the teachings of the present disclosure. Although not limited hereto, battery pack 16 is preferably rechargeable.

BMU 22 is embedded within battery pack 16 and is responsible for protecting cells 20 and monitoring fault conditions which may develop. In an exemplary embodiment, BMU 22 is implemented in software on a digital microcontroller. However, BMU 22 may be embodied in hardware or software as a digital microcontroller, a microprocessor or an analog circuit, a digital signal processor, or by one or more digital ICs such as application specific integrated circuits (ASICs), for example. One suitable BMU 22 includes a Microchip PIC16F616 available from Microchip Technology Inc. and one or more ICs, such as Seiko S-8254 Series ICs available from Seiko Instruments, Inc. This BMU 22 is readily available and of a low cost. This BMU 22 can provide two separate and distinct signals indicative of the voltage of cells 20 relative to two thresholds without specifying the voltage of any particular cell 20, as described below. Other exemplary BMUs 22 can include two or more ICs, such as Seiko S-8204B Series ICs, which can be stacked together to get a higher voltage and which may preclude the need for a microprocessor. It should be appreciated that the teachings of the present disclosure can be utilized by battery packs that do not have a BMU as described herein by using custom circuits producing the same output although all of the advantages may not be realized.

BMU 22 can include a voltage monitoring circuit 24. In an exemplary embodiment, voltage monitoring circuit 24 is integral with BMU 22. In other embodiments, voltage monitoring circuit 24 can be separate from BMU 22. Voltage monitoring circuit 24 may be configured to sense individual cell voltage and sense total pack voltage of cells 20. Voltage monitoring circuit 24 provides a signal representing the individual cell and/or stack voltage that BMU 22 can utilize. Alternatively, BMU 22 may direct voltage monitoring circuit 24 to periodically measure cell voltage across each cell 20 of battery pack 16 and the total battery pack 16 voltage in a sequential manner. A current average cell voltage may be determined by dividing the measured total voltage of battery pack 16 by the number of cells 20 in battery pack 16. BMU 22 can output a simple two-state signal indicative of any cell 20 being at or above or below a low-voltage threshold, as described below. BMU 22 can also output a separate simple two-state signal indicative of any cell 20 being at or above or below a high-voltage threshold, as described below. The low and high-voltage thresholds can be set at the factory when manufacturing BMU 22.

A temperature sensor 26 may be configured to measure the temperature of cells 20. Temperature sensor 26 in turn communicates a signal indicative of measured temperature to BMU 22. Temperature sensor 26 may be implemented with a negative temperature coefficient (NTC) thermistor, as shown, a positive temperature coefficient (PTC) thermistor, temperature sensing integrated circuits, or thermal couples by way of non-limiting example.

Referring to FIG. 2, battery pack 16 is selectively coupled to charger 18. Charger 18 is generally comprised of a power supply circuit 27 and a charger control module 28. Charger 18 may include a terminal voltage detection circuit 29 and a watchdog circuit 31. It is envisioned that other sensing and/or protection circuits may also be incorporated into charger 18. However, this exemplary configuration is merely provided as a context for describing the various protection methods and circuits disclosed herein.

Charger control module 28 is responsible for charging cells 20 and monitoring any fault condition which may develop. In an exemplary embodiment, charger control module 28 is implemented in software on a digital microcontroller. However, charger control module 28 may be embodied in hardware or software as a digital microcontroller, a microprocessor or an analog circuit, a digital signal processor or by one or more digital ICs such as application specific integrated circuits (ASICs), for example.

Battery pack 16 includes a plurality of terminals or pins 30, 32, 34, 36, 38 that are used either when engaged with charger 18 or with power tool 12. First terminal 30 is connected directly to the anode (+polarity) of the most positive cell 20. First terminal 30 can thereby be in continuous uninterruptable communication with the anode. First terminal 30 is utilized when battery pack 16 is in power tool 12 and when battery pack 16 is in charger 18. When engaged with power tool 12, first terminal 30 forms part of the discharge path. When battery pack 16 is engaged with charger 18, first terminal 30 forms part of the charge path and is engaged with power supply circuit 27.

Second terminal 32 is a data terminal that is utilized when battery pack 16 is engaged with charger 18 and is engaged with charger control module 28. Second terminal 32 is used by charger 18 to identify the type of cells 20 within battery pack 16 and to indicate a pre-charge condition (low-voltage condition) for battery pack 16, as described below. Second terminal 32 may also be used with power tool 12 to indicate a low-voltage condition which can trigger a stop to the discharge of cells 20, as described below.

Third terminal 34 is a data terminal that is only utilized when battery pack 16 is engaged with charger 18 and is engaged with charger control module 28. Third terminal 34 can be used by BMU 22 to signal charge step/termination (high-voltage condition) and can also be utilized by charger 18 to monitor battery negative temperature coefficient directly, as described below.

Fourth terminal 36 only makes contact in charger 18. Fourth terminal 36 is the main charge current path for battery pack 16 and engages with power supply circuit 27 of charger 18. Fourth terminal 36 also communicates with the cathode (−polarity) of cells 20. A fuse 42 can be disposed between fourth terminal 36 and the cathode of cells 20. Fuse 42 can rupture to prevent overcharging of battery pack 16.

Fifth terminal 38 is only connected when battery pack 16 engages power tool 12. Fifth terminal 38 is connected directly to the cathode of cells 20 and functions as the main discharge current path for battery pack 16 in powering power tool 12. Fifth terminal 38 can thereby be in continuous uninterruptable communication with the cathode. Fifth terminal 38 may be a shrouded female terminal to prevent accidental shorts.

Figure 3:
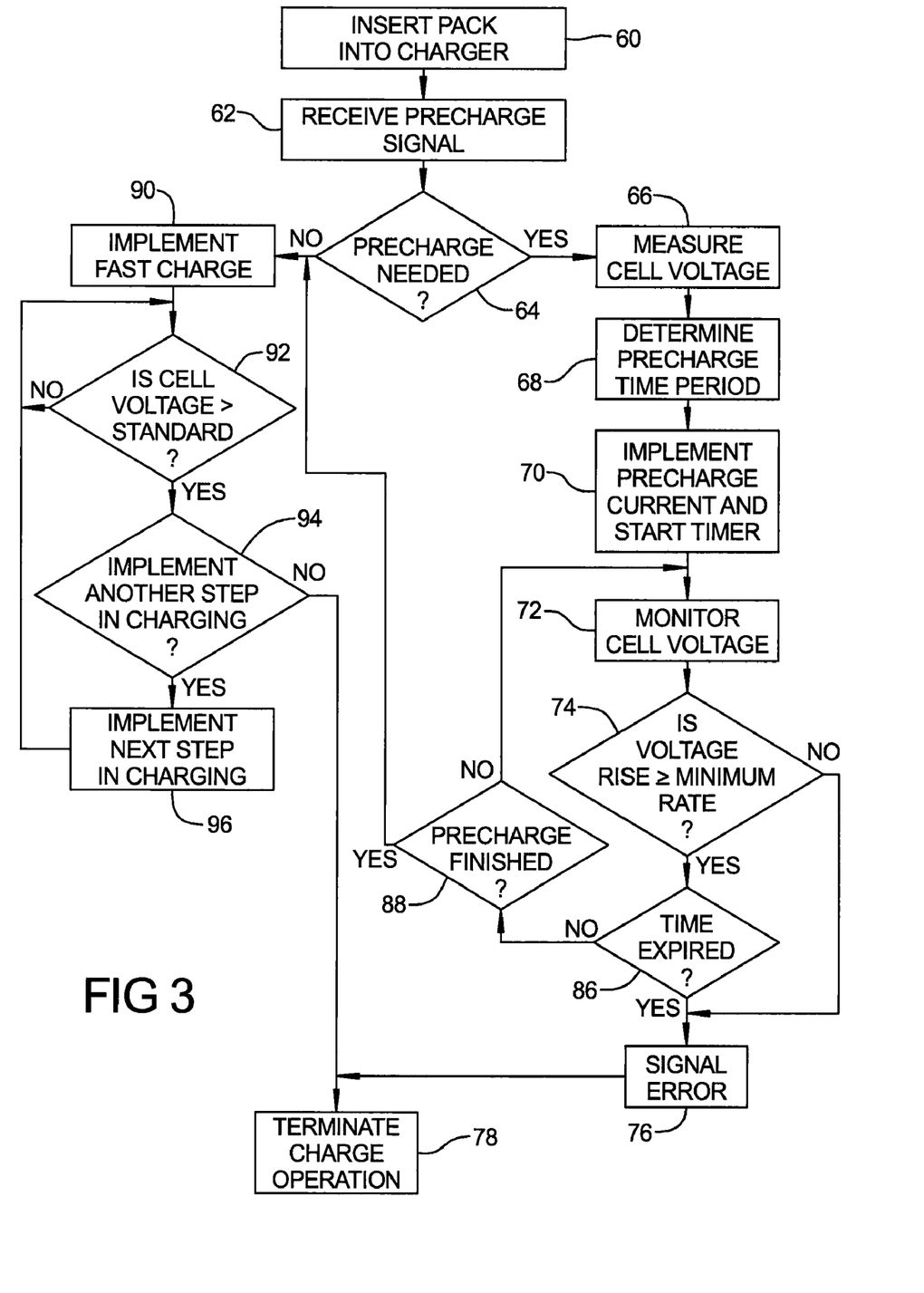
FIG. 3 is a flowchart illustrating a method for charging the battery pack.

Referring to FIG. 3, a flow chart illustrating a method for charging battery pack 16 according to the present disclosure is shown. To begin a charging operation, battery pack 16 is inserted into charger 18, as indicated in block 60. When inserted into charger 18, terminals 30, 32, 34, and 36 engage with associated terminals of charger 18. Charger control module 28 can detect the insertion of battery pack 16 with a signal provided by third terminal 34. Charger control module 28 may discern the chemistry of battery pack 16 using second terminal 32.

BMU 22 ascertains the voltage of cells 20 and generates a pre-charge signal if the voltage of any cell 20 is below a low-voltage threshold which is received by charger control module 28, as indicated in block 62. The pre-charge signal is supplied to charger control module 28 through second terminal 32.

Charger control module 28 ascertains if pre-charging of battery pack 16 is needed based on the pre-charge signal, as indicated in decision block 64. The determination of whether a pre-charge is needed is based upon the voltage of cells 20 of battery pack 16. In particular, when any lithium-ion cell is below a predetermined low-voltage threshold value (an under-voltage condition), battery pack 16 will undergo a pre-charge operation. If the voltage of every cell 20 is greater than the low-voltage threshold value, a pre-charge operation is not needed and a fast charge operation can be implemented, as discussed below. A pre-charge operation corresponds to charging cells 20 with relatively low-level charge current while a fast-charge operation corresponds to charging cells 20 with a relatively high-level charge current. For example, a pre-charge current level can be 100 mA while a fast-charge current level can be 2 A. The low-voltage threshold value can be 2.7 volts, by way of non-limiting example. BMU 22 can supply a simple pre-charge signal that indicates whether the voltage of any cell 20 is below the low-voltage threshold value. For example, BMU 22 can provide an open circuit (high impedance) across second terminal 32 which can be indicative of an under-voltage condition thereby signaling the need for a pre-charge operation. If the voltage of every cell 20 is greater than the low-voltage threshold value, BMU 22 can provide a voltage to second terminal 32, such as the voltage at first terminal 30.

Charger control module 28 will implement either a pre-charge operation or a fast charge operation depending upon the pre-charge signal, as indicated in decision block 64. To implement the pre-charge operation, charger control module 28 determines the aggregate voltage of cells 20, using voltage detection circuit 29, as indicated in block 66.

Next, charger control module 28 determines the appropriate pre-charge time period, as indicated in block 68. The pre-charge time period is not a one-size-fits-all fixed time period. Rather, the pre-charge time period will vary based on one or more operational conditions. The pre-charge time period is selected to allow for a sufficient duration of time for the voltage of cells 20 to increase to above the low-voltage threshold value when being supplied with a pre-charge current while also limiting the time duration of the pre-charge operation. Charger control module 28 can determine the pre-charge time period utilizing a formula and the measured voltage of cells 20. One exemplary formula is $t=S(V)+C$, where t is the pre-charge time period, (V) is the voltage of battery pack 16, S is a slope constant and C is a constant offset voltage. The Voltage (V) can be measured by voltage detection circuit 29 at the time battery pack 16 is engaged with charger 18. C is the constant offset voltage and may allow the greatest usable voltage range. S is the slope constant. The resulting pre-charge time period t is used in conjunction with a countdown timer, as discussed below. The formula can be based upon the rate at which healthy cells 20 can be raised from an initial voltage to a second voltage utilizing the pre-charge current. Alternatively, pre-charge time periods can be retrieved from a lookup table. One exemplary table is:

| Voltage (Per cell) | Per-Charge Time Period (minutes) |
| --- | --- |
| 0-.5 | 30 |
| .5-1 | 24 |
| 1-1.5 | 18 |
| 1.5-2 | 12 |
| 2-2.5 | 6 |
| 2.5-3 | 3 |

The voltage (V) can be measured by the voltage detection circuit 29 at the time battery pack 16 is engaged with charger 18. The voltage can be used with lookup table values above and the resulting pre-charge time period is used in conjunction with a countdown timer, as discussed below. The pre-charge time period can correlate to the initial voltage of cells 20. The higher the initial voltage of cells 20, the shorter the pre-charge time period. The pre-charge time periods can be stored in a lookup table stored in a memory device associated with charger control module 28. It is readily understood that table values will depend on the particular application and may be derived accordingly.

Next, charger control module 28 implements the pre-charge current and starts a timer, as indicated in block 70. Charger control module 28 can command power supply circuit 27 to begin supplying electrical current to battery pack 16 at a pre-charge level.

Charger control module 28 monitors the voltage of cells 20 during charging, as indicated in block 72. This can be accomplished using voltage detection circuit 29.

The pre-charge operation according to the present disclosure uses the monitored cell voltage to ascertain whether cells 20 are rising in voltage as a function of time at a rate that is indicative of cells 20 being healthy. Specifically, charger control module 28 monitors the voltage characteristics of battery pack 16 periodically during the pre-charging process. Voltage measures are provided by voltage detection circuit 29 and may be sampled at periodic time intervals (e.g., every 19 seconds). In an exemplary embodiment, the voltage measures are stored in a FIFO stack residing in a memory associated with charger control module 28.

The slope of the charge curve (voltage change as function of time) may be obtained by subtracting an old voltage value from a new voltage value to get a voltage difference between the two voltage values. In an exemplary embodiment, the slope of the charge curve may be computed over a plurality of voltage measures. For example, assuming a stack of 16 values, $V_{old}$ can be calculated as an average voltage value of the eight oldest values and $V_{new}$ can be calculated as an average voltage value of the eight newest values. An average of several voltage measures reduces the effects of noise. U.S. Pat. No. 5,268,630 issued to Bhagwat et al. teaches varying the stack size to achieve different criteria. For instance, a large stack may be used when the slope is small to provide good noise immunity and gain and then switching to a small stack when the slope is large to achieve a faster response. Teachings of U.S. Pat. No. 5,268,630 are incorporated herein by reference.

Charger control module 28 ascertains if the rate of voltage rise or slope is sufficient to continue the pre-charging operation. If the voltage rise curve does not have a positive slope or has a slope that is unusually flat, that slope can be indicative of one or more cells 20 being damaged within battery pack 16. In contrast, when the voltage rise curve has a sufficient slope, that slope can be indicative of healthy cells 20 and a proper pre-charging operation occurring. In the event that the voltage rise curve does not meet the minimum rate, as determined in decision block 74, charger control module 28 will signal an error, as indicated in block 76, and terminate the charge operation, as indicated in block 78.

Figure 4:
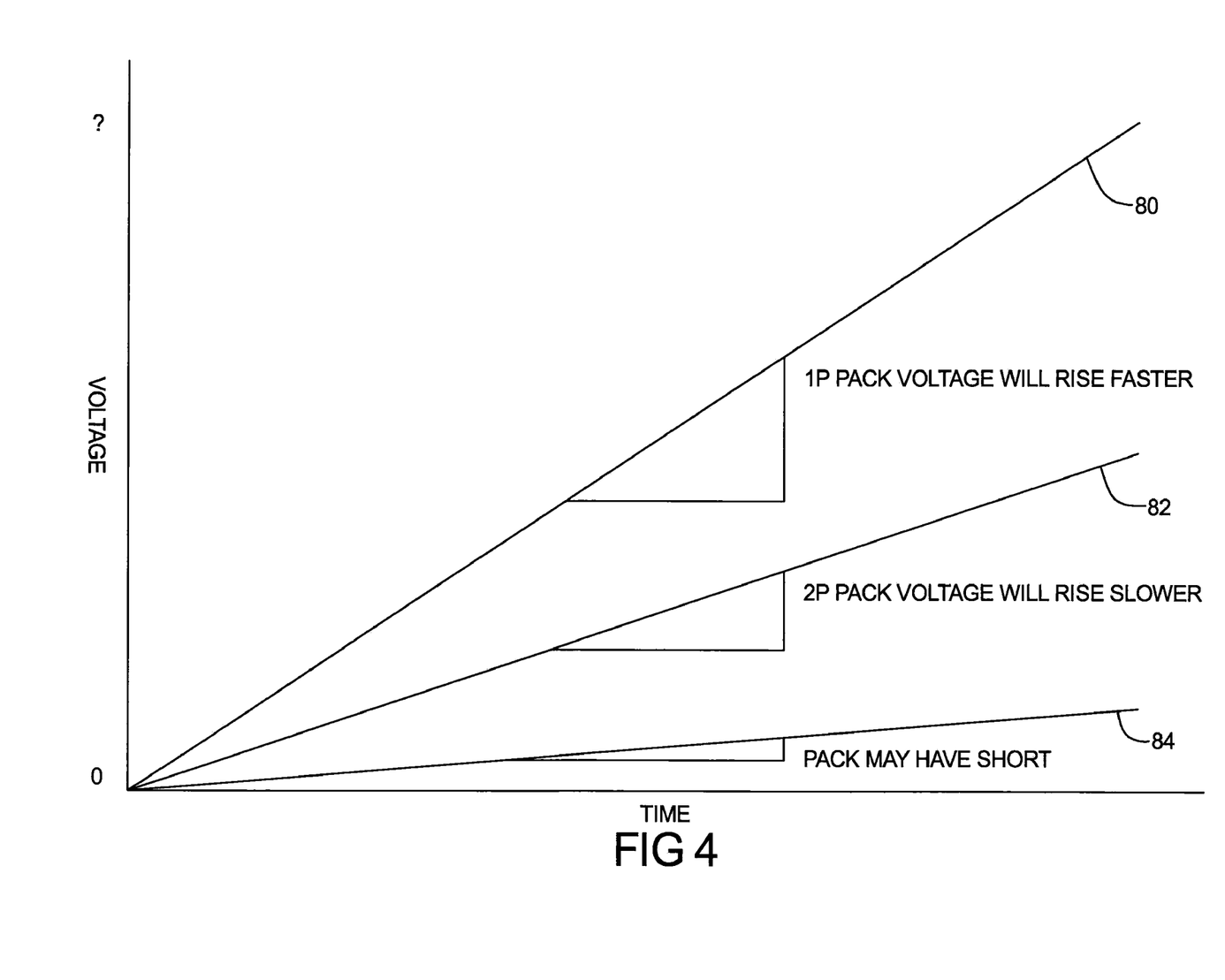
FIG. 4 is a graph of hypothetical voltage of the battery pack as a function of time during a pre-charge operation.

The particular rate of voltage rise or slope that indicates a proper charging operation can vary depending upon the type of battery pack 16 and the health of cells 20. For example, as shown in FIG. 4, a plot of a change in the stack voltage of a battery pack as a function of time during a pre-charging operation is shown. The curves of the voltage change indicated with reference indicia 80 and 82 may be indicative of different battery packs both of which are exhibiting sufficient rates of voltage rise to indicate proper charging and can continue in the pre-charging operation. In contrast, the curve indicated with indicia 84, while having a positive rise and slope, may be indicative of a battery pack that is not exhibiting a sufficient voltage rise as a function of time and may be indicative of a short or other problem with one or more of cells 20. By way of example, a battery pack 16 having one or more bad cells (e.g., shorted cell(s)) may have a slope between 0 and 10 mV/minute, while a healthy battery pack 16 may have a slope between 11 mV/minute and 100 mV/minute, or a slope greater than 101 mV/minute. The actual slope(s) that are indicative of a healthy and unhealthy battery pack 16 can depend on cell impedances and some slopes could overlap depending on cell configuration.

If charger control module 28 determines that the rate of the voltage rise is greater than or equal to a minimum rate, as indicated in decision block 74, charger control module 28 then checks to see if time is expired, as indicated in decision block 86. Specifically, charger control module 28 can compare the pre-charge time period determined in block 68 against the value of the timer that was started in block 70. If the time period has expired, while the pre-charging operation is continuing, that is indicative of a possible bad battery pack 16. In this case, charger control module 28 signals an error, as indicated in block 76, and the charging operation is terminated, as indicated in block 78.

If the time period is not expired, however, charger control module 28 ascertains if the pre-charge operation is finished, as indicated in decision block 88. Specifically, BMU 22 continues to monitor the voltage of cells 20. When the voltage of each cell 20 exceeds the low-voltage threshold value, the signal provided to charger control module 28 via second terminal 32 will change, such as to a voltage value. If charger control module 28 continues to see the open or high-impedance signal from second terminal 32, charger control module 28 will continue to monitor the voltage of battery pack 16, determine if the rate of voltage rise is greater than or equal to a minimum rate, and determine whether or not time has expired, as indicated in blocks 72, 74, 86. This looping will continue until either the rate of voltage rise is insufficient, the time has expired, or the voltage of cells 20 has exceeded the low-voltage threshold value.

In some embodiments, the pre-charge time period can be a set time period, such as three minutes by way of example. When this is the case, the pre-charging operation can rely upon charger control module 28 monitoring second terminal 32 to ascertain when the voltage of each cell 20 exceeds the low-voltage threshold value instead of looking for a rate of voltage change. Thus, in this embodiment, the steps associated with blocks 66, 68, 70, 72 and 74 will be altered accordingly and/or skipped. Furthermore, in this embodiment, charger 18 can rely upon the signal at second terminal 32 for both implementing a pre-charge operation and terminating a pre-charge operation. In other embodiments, the set time period can be used in conjunction with the monitoring of the rate of voltage rise discussed above and associated with blocks 72 and 74.

Referring back to the operation shown in FIG. 3, when the low-voltage threshold value has been exceeded (or when no pre-charge was needed), charger control module 28 implements a fast charge operation, as indicated in block 90. The fast charge can be implemented by charger control module 28 commanding power supply circuit 27 to supply a current to battery pack 16 that is of a higher amperage than that utilized for the pre-charge operation. For example, the fast charge operation can utilize a charging current of 2 A.

When implementing the fast charge operation, charger control module 28 watches to see if the cell voltage has exceeded a predetermined standard, as indicated in decision block 92. Specifically, BMU 22 monitors the voltage of cells 20 with voltage monitoring circuit 24. When the voltage of any cell 20 exceeds a high-voltage threshold value, BMU 22 provides a signal to charger control module 28 via third terminal 34. This can be achieved by changing the voltage at third terminal 34 to a low-level, by way of non-limiting example. The high-voltage threshold value can be 4.1 volt by way of non-limiting example. If BMU 22 does not provide the signal, charger control module 28 continues to monitor third terminal 34 and the fast charge operation continues.

When the voltage of any cell 20 exceeds the high-voltage threshold value, as signaled by BMU 22 at third terminal 34, charger control module 28 sees the change in the signal at third terminal 34 and determines whether to implement another step in charging, as indicated in decision block 94. In particular, the charging process can involve multiple charging steps wherein the voltage of one or more cells 20 in battery pack 16 are continually brought up to and exceed the high-voltage threshold value while achieving such with differing charge currents. Charger control module 28 can maintain the number of charger steps that have occurred and implement the appropriate next step in the charging sequence, as indicated in block 96. The next step in the charging can be mid-level charging wherein charger control module 28 commands power supply circuit 27 to supply a charge current to battery pack 16 that is less than the fast charge current but greater than the pre-charge current. For example, the mid-charge current can be 1 A.

Charger control module 28 continues to look for a change in the voltage at third terminal 34 which is indicative of the voltage of any cell 20 exceeding the high-voltage threshold value, as signaled by BMU 22. When this occurs, charger control module 28 can again determine whether to implement yet another step in the charging operation, as indicated in decision block 94. For example, yet another step that can be implemented in the charging operation may be a low-level charging step wherein charger control module 28 commands power supply circuit 27 to supply a low-charge current to battery pack 16. For example, the low-level charge current can be 100 mA.

Charger control module 28 continues to implement the various charging steps until it is determined that no more steps are to be implemented, as indicated in decision block 94. At that time, charger control module 28 terminates the charging operation, as indicated in block 78.

It should be appreciated that if a pre-charge is determined to not be needed, as indicated in decision block 64, charger 18 immediately implements the fast charge, as indicated in block 90, and continues with the above sequence associated with the fast-charging operation.

Additionally, it should be appreciated that during the charging operations, the temperature of battery pack 16 can be monitored using temperature sensor 26. If the temperature of battery pack 16 were to exceed a pre-determined maximum temperature or experience a temperature rise at a rate greater than a pre-determined value, charger 18 can cease the charging operation. Moreover, there may be additional protective measures.

Furthermore, it should be appreciated that in some embodiments charger control module 28 may reassess the pre-charge time period, as determined in block 68. The reassessing of the pre-charge time period may be implemented to take into account changes in the operational condition of battery pack 16 during the pre-charging operation. In such a case, the pre-charge time period can be re-established and the timer restarted.

Battery pack 16 can include multiple protections against overcharging of cells 20. A first level of protection is provided by temperature sensor 26. In particular, in the event that temperature sensor 26 indicates an over temperature condition, BMU 22 can change the signal at terminal 34. Charger control module 28, in response to the signal change at terminal 34, can instruct power supply circuit 27 to cease charging battery pack 16. A first over-voltage protection feature can also be provided by BMU 22 signaling the voltage of any cell 20 exceeding the high-voltage threshold value. BMU 22 can change the signal at terminal 34 to indicate that the voltage of any cell 20 has exceeded the high-voltage threshold value. In response to this change in signal, charger control module 28 commands power supply circuit 27 to cease charging battery pack 16.

In battery pack 16 according to the present disclosure, a second over-voltage protection feature 98 is provided. Second over-voltage protection (OVP) feature 98 includes a resettable switch that can disrupt the communication between the cathode of cells 20 and terminal 36. Second OVP feature 98 can include a standard off-the-shelf IC which can control an FET in response to an over-voltage condition. For example, second OVP feature 98 can have a set point that is slightly higher than the high-voltage threshold value. For example, the set point can be 125 mV higher than the high-voltage threshold value. Second OVP feature 98 can advantageously provide a second level of over-voltage protection for charging of battery pack 16 while also being resettable. The resettable nature of second over-voltage protection feature 98 allows for the protection of battery pack 16 without requiring that the battery pack 16 be ruined or require internal service in the event that the first over-voltage protection feature fails. As a backup to second OVP feature 98, fuse 42 can also disrupt communication between fourth terminal 36 and the cathode of cells 20 in event that both a first and second over-voltage protection features fail.

Figure 5:
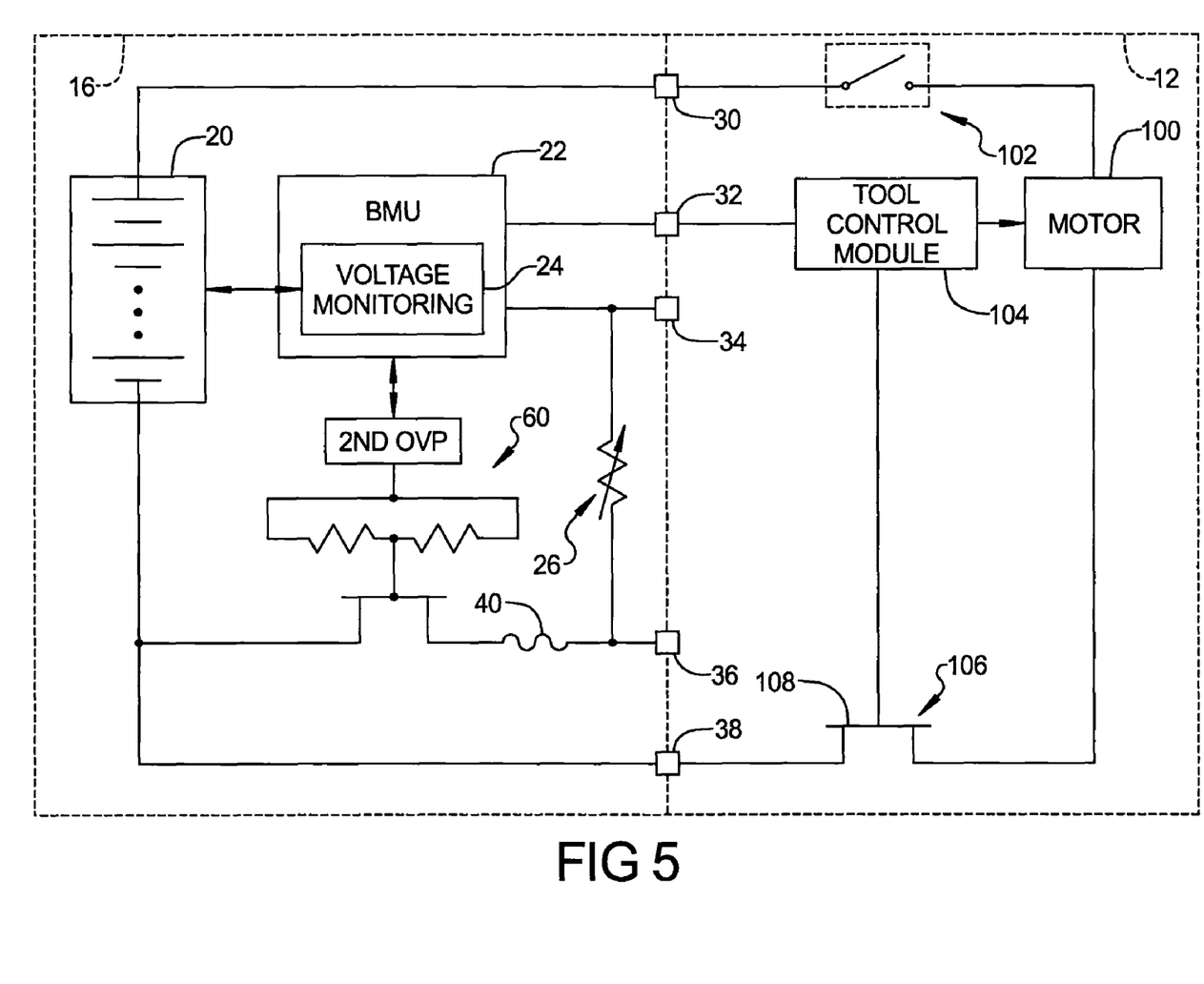
FIG. 5 is a block diagram of an exemplary configuration for a battery pack operably coupled to a power tool.

Referring now to FIG. 5, a block diagram of battery pack 16 operably coupled to power tool 12 is shown. Power tool 12 is generally comprised of a motor 100, an actuation mechanism 102 (such as a trigger assembly by example), and a tool control module 104. Power tool 12 includes an under-voltage protection circuit 106. It is envisioned that other sensing and/or protection circuits may also be incorporated into power tool 12. However, this exemplary configuration is merely provided as a context for describing the various protection methods and circuits disclosed herein.

Tool control module 104 is responsible for allowing motor 100 to drive power tool 12 along with monitoring fault conditions which may develop. In an exemplary embodiment, tool control module 104 is implemented in software on a digital microcontroller. However, tool control module 104 may be embodied in hardware or software as a digital microcontroller, a microprocessor or an analog circuit, a digital signal processor, or by one or more digital ICs such as application specific integrated circuits (ASICs), for example.

First terminal 30 of battery pack 16 communicates with actuation mechanism 102 which in turn communicates with motor 100. First terminal 30 forms part of the main discharge current path. Second terminal 32 provides data to tool control module 104. As stated above, BMU 22 can provide a varying signal at second terminal 32 based on the voltage of cells 20. For example, when any cell 20 is below the low-voltage threshold value, second terminal 32 can be open such that tool control module 104 sees a high impedance. This is also referred to as second terminal 32 being de-asserted. When the voltage of every cell 20 exceeds the low-voltage threshold value, BMU 22 can provide a voltage at second terminal 32 which can be detected by tool control module 104. This is also referred to as second terminal 32 being asserted.

Third and fourth terminals 34, 36 are not utilized when battery pack 16 is engaged with power tool 12. Fifth terminal 38 communicates with motor 100 and forms part of the main discharge current path for battery pack 16.

In system of power tools 10 according to present disclosure, power tool 12 includes an under-voltage protection (UVP) circuit 106. In the exemplary embodiment, UVP circuit 106 includes a switch 108 which is located between fifth terminal 38 and motor 100. UVP circuit 106 is responsive to signals from BMU 22 via tool control module 104. In particular, UVP circuit 106 is responsive to the signal provided at second terminal 32 by BMU 22. For example, when second terminal 32 is asserted (voltage of all cells 20 are above the low-voltage threshold value), switch 108 can be engaged and allow motor 100 to communicate with fifth terminal 38 thereby providing the discharge path to cells 20. When second terminal 32 is de-asserted (voltage of any cell 20 is below the low-voltage threshold value), switch 108 can be energized to prevent discharge of cells 20 by interrupting the main discharge current path.

The disposing of UVP circuit 106 in power tool 12 can advantageously reduce the complexity and cost of battery pack 16. In particular, the inclusion of UVP circuit 106 in power tool 12 eliminates the need for battery pack 16 to include a discharge switch which can be acted upon by BMU 22, such as a MOSFET. The removal of a MOSFET from battery pack 16 reduces the cost along with saving additional space that can be occupied by other components of battery pack 16.

While UVP circuit 106 is shown as including a switch 108 in the form of an FET, it should be appreciated that the signal provided by second terminal 32 could be utilized to provide power and remove power from a timer circuit, such as when power tool 12 is a variable speed tool. In this embodiment, when second terminal 32 is asserted, power can be provided to the timer circuit which serves to indicate that battery pack 16 is powered and functions normally and allows discharge of battery pack 16. When second terminal 32 is de-asserted, the timer circuit would lose power and discharge would be disabled.

Thus, in system of power tools 10 according to the present disclosure, battery pack 16 can utilize a BMU 22 that only provides two output signals. One of the output signals is provided by second terminal 32 which is indicative of the voltage of any cell 20 being below or the voltage of every cell 20 being at or above a low-voltage threshold value. The other signal is provided at third terminal 34 and is indicative of the voltage of any cell 20 being at or above or the voltage of every cell 20 being below the high-voltage threshold value. These simple signals provided by second and third terminals 32, 34 can allow for the use of a less expensive BMU 22, such as an off-the-shelf microprocessor discussed above. The low-voltage threshold value and the high-voltage threshold value can be established at the factory during production of BMU 22.

Additionally, this arrangement allows the low-voltage signal provided at second terminal 32 to function as both a pre-charge indicator when utilized with charger 18 and as a stop-discharge signal when utilized in power tool 12. Thus, this single signal provided at second terminal 32 can serve two separate and distinct functions that can be utilized by charger 18 and power tool 12. The signal provided at second terminal 32 is the same regardless of battery pack 16 being engaged with charger 18 or power tool 12.

Furthermore, the inclusion of UVP circuit 106 in power tool 12 instead of in battery pack 16 advantageously allows for a less expensive battery pack 16 to be produced. Moreover, this also frees up space in battery pack 16 that would otherwise be taken up by an internal under-voltage protection circuit.

Thus, the system of power tools 10 according to the present disclosure advantageously allows for a simpler and less expensive BMU 22 and a less expensive and more space-efficient battery pack 16. Moreover, the pre-charge operation can take into account the initial status of cells 20 of battery pack 16 when implementing a pre-charge operation. The pre-charge operation is not a one-size-fits-all application and, rather, relies upon the initial condition of cells 20 to determine an appropriate maximum time to utilize when conducting a pre-charge operation. This may advantageously allow battery packs 16, which would otherwise have signaled an error during the charging process and not be charged, to be safely and adequately charged.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A battery charger operable to charge a battery pack having a plurality of battery cells and at least one data terminal providing an under voltage signal indicative of a voltage of the battery cells relative to a low voltage threshold, the charger comprising:
   a power supply circuit operable to supply a first charge current of a first value and a second charge current of a second value substantially less than the first value; and
   a charger control module adapted to receive the under voltage signal from the data terminal of the battery pack and operable to direct the power supply circuit to supply the first and second charge currents based on the under voltage signal,
   wherein the power supply circuit supplies the first charge current when the under voltage signal is indicative of every one of the battery cells being at or above the low voltage threshold, and the power supply circuit supplies the second charge current when the under voltage signal is indicative of any one of the battery cells being below the low voltage threshold.

2. The charger of claim 1, wherein the power supply circuit supplies the first charge current when the under voltage signal is at a first state and the power supply circuit supplies the second charge current when the under voltage signal is at a second state different than the first state.

3. The charger of claim 1, further comprising a voltage detection circuit operable to detect an aggregate voltage of the battery cells of the battery pack and the charger control module is operable to cease the supplying of the charger current based on the detected aggregate voltage.

4. The charger of claim 1, wherein the power supply circuit is operable to charge battery cells that include lithium.

5. The charger of claim 1, wherein the power supply circuit supplies the second charge current for no longer than a threshold time period.

6. The charger of claim 5, wherein the threshold time period is a fixed time period.

7. The charger of claim 5, wherein the charger control module monitors the time duration for which the power supply circuit supplies the second charge current and causes the power supply circuit to stop supplying the second charge current and to start supplying the first charge current when the under voltage signal switches to indicating that every one of the battery cells is at or above the low voltage threshold and the time duration is less than the threshold time period.

8. The charger of claim 5, wherein the charger control module monitors the time duration for which the power supply circuit supplies the second charge current and causes the power supply circuit to stop supplying the second charge current and prevents the power supply circuit from supplying the first charge current when the under voltage signal continues to indicate that any one of the battery cells is below the low voltage threshold and the time duration exceeds the threshold time period.

9. A power tool battery pack charger comprising:
   a charger operable to engage with the battery pack having at least one battery cell and to supply a charge current, the charger including:
      a power supply circuit operable to supply a charge current of first and second values, the second value being substantially less than the first value;
      a voltage detection circuit operable to detect a voltage of an engaged battery pack; and
      a charger control module adapted to receive a signal from the voltage detection circuit indicative of the voltage of the battery pack and operable to control supplying of the charge current from the power supply circuit to the battery pack, the charger control module adapted to determine a time period for a pre-charge operation based on the voltage of the battery pack, the charger control module adapted to monitor a change in the voltage of the battery pack during the pre-charge operation, and the charger control module operable to stop the pre-charge operation as a function of the change in voltage and the time period, wherein the pre-charge operation is characterized by the supplying of the charge current at the second value.

10. The power tool battery pack charger of claim 9, wherein the charger control module determines the time period from a look-up table.

11. The power tool battery pack charger of claim 9, wherein the charger control module calculates the time period as a function of an initial detected voltage of the battery pack.

12. The power tool battery pack charger of claim 9, wherein the charger control module determines a rate of change of the voltage of the battery pack and compares the range of change to a threshold and conducts the pre-charge operation based on the comparison.

13. The power tool battery pack charger of claim 12, wherein the threshold is a minimum rate of voltage change and the charger control module terminates the pre-charge operation when the rate is below the threshold.

14. The power tool battery pack charger of claim 9, wherein the time period is based on an initial voltage of the battery pack prior to the initiation of the pre-charge operation.

15. The power tool battery pack charger of claim 9, wherein the charger control module is adapted to receive a signal from the battery pack indicative of a need to conduct a pre-charge operation and the charger control module only implements the pre-charge operation so long as the signal from the battery pack indicates the need for the pre-charge operation.

16. A method of operating a system of power tools having a cordless power tool, a rechargeable battery pack, and a charger, the method comprising:
(a) charging the battery pack with the charger, the charging including:
engaging a first pair of terminals of the battery pack with the charger, the first pair of terminals communicating with battery cells of the battery pack;
engaging a data terminal of the battery pack with the charger;
receiving an under voltage signal with the charger at the data terminal, the under voltage signal being indicative of whether a voltage of any one of the battery cells is below a low voltage threshold without identifying any particular battery cell;
supplying a charge current of a first value to the battery pack with the power supply circuit in the charger when the low voltage signal is indicative of the voltage of every one of the battery cells being at or above the low voltage threshold and supplying a charge current of a second value substantially less than the first value to the battery pack with the power supply circuit in the charger when the low voltage signal is indicative of the voltage of any one of the battery cells being below the low voltage threshold, the power supply circuit communicating with the first pair of terminals; and
(b) powering the power tool with the battery pack, the powering including:
engaging a second pair of terminals of the battery pack with the power tool, the second pair of terminals communicating with the battery cells of the battery pack;
engaging the data terminal with the power tool;
receiving the under voltage signal with the power tool at the data terminal; and
supplying a discharge current from the battery cells to a motor of the power tool based on the under voltage signal received by the power tool, the motor communicating with the second pair of terminals.

17. The method of claim 16, wherein supplying a discharge current includes supplying the discharge current when the under voltage signal is indicative of the voltage of every one of the battery cells being at or above the low voltage threshold and preventing the flow of a discharge current when the low voltage signal is indicative of the voltage of any one of the battery cells being below the low voltage threshold.

18. The method of claim 16, further comprising generating the low voltage signal at the data terminal with a battery management unit in the battery pack.

19. The method of claim 16, further comprising controlling the supplying of the charge current with a charger control module in the charger and controlling the supplying of the discharge current with a tool control module in the power tool.

20. A method of charging a power tool battery pack having at least one battery cell with a charger adapted to engage with the battery pack, the method comprising:
determining whether to implement a first charging operation using a charge current of a first value or a second charging operation using a charge current of a second value substantially less than the first value;
implementing the second charging operation when a voltage of the battery pack is below a low voltage threshold, implementing the second charging operation including:
detecting an initial voltage of the at least one battery cell with a voltage detection circuit;
determining a time period for the second charging operation as a function of the detected initial voltage;
supplying the charge current of the second value to the at least one battery cell with a power supply circuit in the charger;
monitoring a voltage of the at least one battery cell;
determining a change in the voltage of the at least one battery cell over time during the second charging operation;
terminating the second charging operation based on the determined time period and the change in the voltage; and
implementing the first charging operation when the voltage of the battery pack is at or above the low voltage threshold.

21. The method of claim 20, wherein terminating the second charging operation includes comparing the determined change in voltage to a threshold and terminating the second charging operation if the change in voltage is less than the threshold.

22. The method of claim 21, wherein determining a change in voltage includes determining a rate of change of the voltage as a function of time and the threshold is a minimum rate of voltage increase as a function of time.

23. The method of claim 20, wherein determining a time period includes calculating the time period based on a formula and the initial voltage.

24. The method of claim 20, wherein determining a time period includes retrieving the time period from a look-up table based on the initial voltage.

25. The method of claim 20, further comprising monitoring a low voltage signal provided by the battery pack which is indicative of a voltage of the at least one battery cell relative to the low voltage threshold and wherein terminating the second charging operation includes terminating the second charging operation if the low voltage signal is indicative of the voltage of the at least one battery cell being at or above the low voltage threshold.

26. The method of claim 20, wherein detecting an initial voltage includes detecting the initial voltage with a voltage detection circuit in the charger.

27. The method of claim 20, wherein determining whether to implement the first or second charging operation includes receiving a low voltage signal provided by the battery pack which is indicative of a voltage of the at least one battery cell relative to the low voltage threshold and implementing the first charging operation if the low voltage signal is indicative of the voltage of the at least one battery cell being at or above the low voltage threshold, and implementing the second charging operation if the low voltage signal is indicative of the voltage of the at least one battery cell being below the low voltage threshold.

28. A method of charging a power tool battery pack having at least one battery cell with a charger adapted to engage with the battery pack, the method comprising:
   monitoring a signal from the battery pack indicative of either the voltage of any one cell being below a low voltage threshold or the voltage of every cell being at or above the low voltage threshold;
   determining whether to implement a first charging operation using a charge current of a first value or a second charging operation using a charge current of a second value substantially less than the first value based on the signal from the battery pack;
   implementing the second charging operation when the signal indicates that the voltage of any cell of the battery pack is below the low voltage threshold, implementing the second charging operation including:
      supplying the charge current of the second value to the at least one battery cell with a power supply circuit in the charger;
      monitoring a time duration that the charge current of the second value is supplied;
      terminating the second charging operation based on the time duration and the signal.

29. The method of claim 28, wherein terminating the second charging operation includes preventing the implementation of the first charging operation when the time duration exceeds a threshold and the signal continues to indicate that the voltage of any cell of the battery pack is below the low voltage threshold.

30. The method of claim 28, wherein terminating the second charging operation includes implementing the first charging operation when the signal indicates that the voltage of every cell is at or above the low voltage threshold and the time duration is below a threshold.

* * * * *

UNITED STATES PATENT AND TRADEMARK OFFICE
CERTIFICATE OF CORRECTION

PATENT NO. : 8,154,248 B2  
APPLICATION NO. : 12/247086  
DATED : April 10, 2012  
INVENTOR(S) : Nathan Cruise et al.

Page 1 of 1

It is certified that error appears in the above-identified patent and that said Letters Patent is hereby corrected as shown below:

In the Claims:

Column 13,
Line 20, claim 12, "range" should be -- rate --.

Signed and Sealed this
Third Day of July, 2012

David J. Kappos
*Director of the United States Patent and Trademark Office*